United States Patent [19]

Kishimoto

[11] Patent Number: 5,519,642

[45] Date of Patent: May 21, 1996

[54] ELECTRONIC SURVEY INSTRUMENT

[75] Inventor: Hiroshi Kishimoto, Yokohama, Japan

[73] Assignee: Nikon Corporation, Tokyo, Japan

[21] Appl. No.: 229,794

[22] Filed: Apr. 19, 1994

[30] Foreign Application Priority Data

Apr. 19, 1993 [JP] Japan .................. 5-091031

[51] Int. Cl.⁶ .................................. G01C 1/02
[52] U.S. Cl. .................. 364/561; 33/1 T; 33/281; 33/284; 33/285
[58] Field of Search ............... 33/1 T, 281, 282, 33/283, 284, 285, 290, 292; 356/3; 364/561, 562, 705.01; 361/92

[56] References Cited

U.S. PATENT DOCUMENTS

| 3,417,394 | 12/1968 | Sauberlich | 33/281 X |
| 4,327,410 | 4/1982 | Patel et al. | 395/425 |
| 4,948,138 | 8/1990 | Pease et al. | 273/138 A |
| 4,999,575 | 3/1991 | Germer | 324/142 |
| 5,291,262 | 3/1994 | Dunne | 356/5 |

FOREIGN PATENT DOCUMENTS

| 0415376 | 3/1991 | European Pat. Off. . |
| 2229822 | 10/1990 | United Kingdom . |

*Primary Examiner*—Edward R. Cosimano

[57] ABSTRACT

An electronic survey instrument is controlled in accordance with a computer program to store a display image and a count value immediately before a power source is cut off. The display image and count values may then be restored without substantial initialization of the electronic survey instrument. The instrument includes a main system for operating in accordance with a survey program, and plural subsystems for operation based on a control signal from the main system. The main system saves information into a memory immediately before a power-off time and restores the information saved in the memory at the next power-on time. End information corresponding to the saved information is also saved into the memory to normally cut-off the power source. An information restoring process is canceled by the main system at the next power-on time when the end information has not been stored in the memory.

4 Claims, 20 Drawing Sheets

3,519,642

ELECTRONIC SURVEY INSTRUMENT

BACKGROUND OF THE INVENTION

1. Field of the Invention

The present invention relates to an electronic survey instrument which is controlled by computer programs.

2. Related Background Art

Recently, as for various survey instruments having distance and angle measuring functions, many electronic survey instruments which are controlled based on a computer program have been proposed.

In the conventional electronic survey instruments, since a data recorder connected to a survey instrument records survey data, if the power source therefor is cut off during surveying or after completion, measurement data are stored on a recording portion in a data recorder. However, a display image and count values, displayed on a display device of the survey instrument, are also cleared due to a power-off operation. Hence, when the system is resumed by the next power-on operation, a display image must be updated and a predetermined count value must be loaded.

SUMMARY OF THE INVENTION

In order to overcome the above mentioned technical problems, an object of the present invention is to provide an electronic survey instrument which can normally restore a display image, count values and so on immediately before a power-off time, i.e. when a power source is cut off and then resumed.

Particularly, in a case where a power source is unexpectedly cut off or a battery, for example, is suddenly taken out, a runaway (or crush) may occur at the next power-on operation because a program will continually seek for information which should be restored from memory or will find improper information.

Another object of the present invention is to provide an electronic survey instrument which can restore information saved in a memory following power-on only in a case when latest power-off operation was normally effected.

An electronic survey instrument according to an embodiment of the present invention includes a main system which operates in accordance with a survey program, and plural subsystems each for operating based on a control signal from the main system. The plural subsystems include a survey subsystem for surveying, a display subsystem for displaying a result measured with the survey subsystem, and a power source subsystem for controlling a power source used for the main system, the survey subsystem, and the display subsystem.

The main system includes resume means for saving information into a memory immediately before a power source is cut off and for restoring the information stored in the memory at the next power-on time; means for storing end information indicating that an information saving process to the memory has been performed to normally cut off a power source; and canceling means for canceling an information restoring process by the resume means at next power-on time in the case the end information has not been stored.

Therefore, an electronic survey instrument according to an embodiment of the present invention, may store end information in a normal power-off state, and the information stored in a memory can be restored at the following power-on time only when the end information has been stored.

No end information stored means that a power source has not been normally cut off. In this case, the canceling means cancels the restoring process, thus preventing a system runaway.

These and other objects of the present invention will become apparent from the following drawings and detailed description taken in connection with the drawings.

DETAILED DESCRIPTION OF THE PREFERRED EMBODIMENTS

Figure 1:
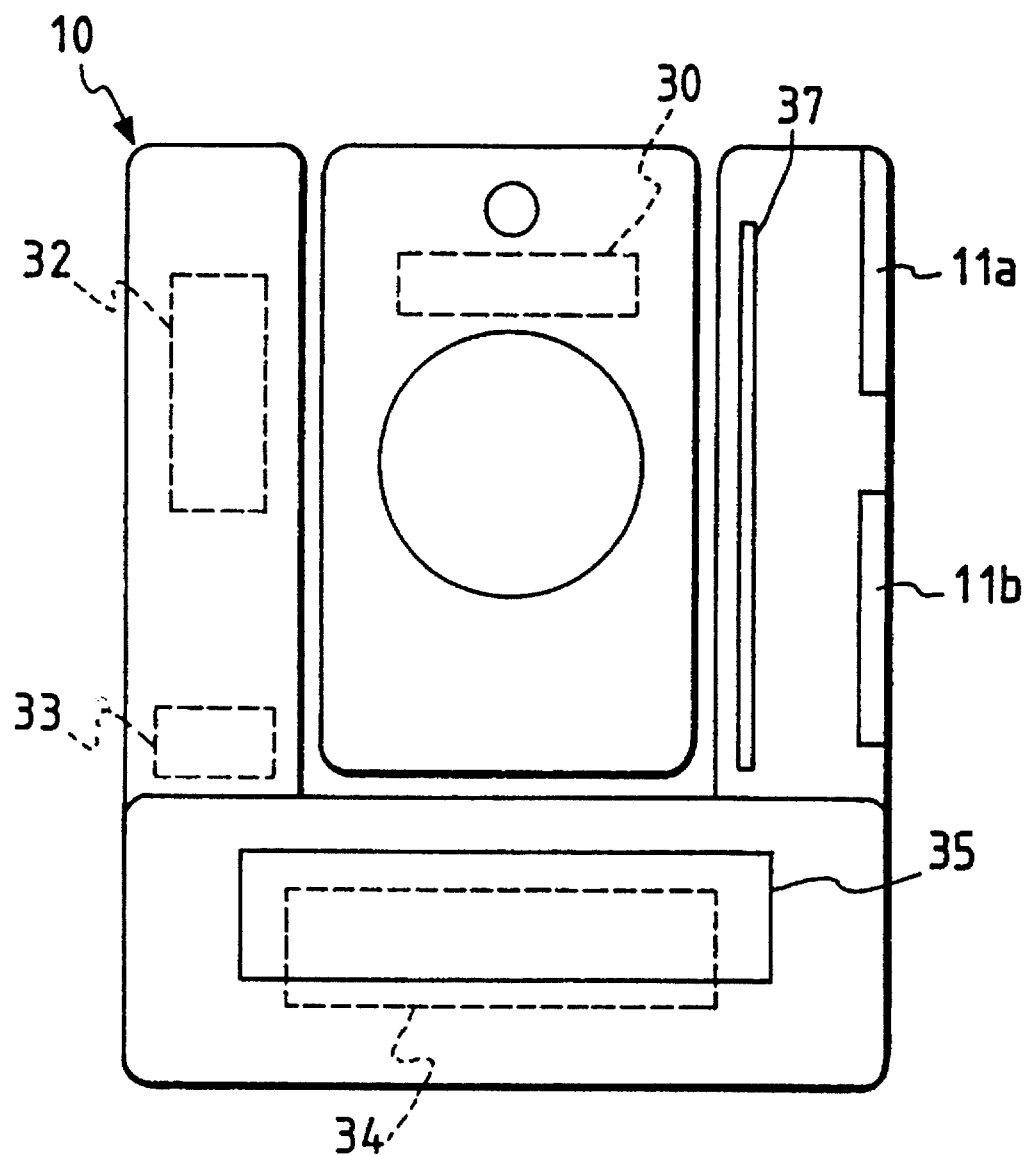
FIG. 1 is a general diagram showing an electronic survey instrument according to the present invention.
Figure 2:
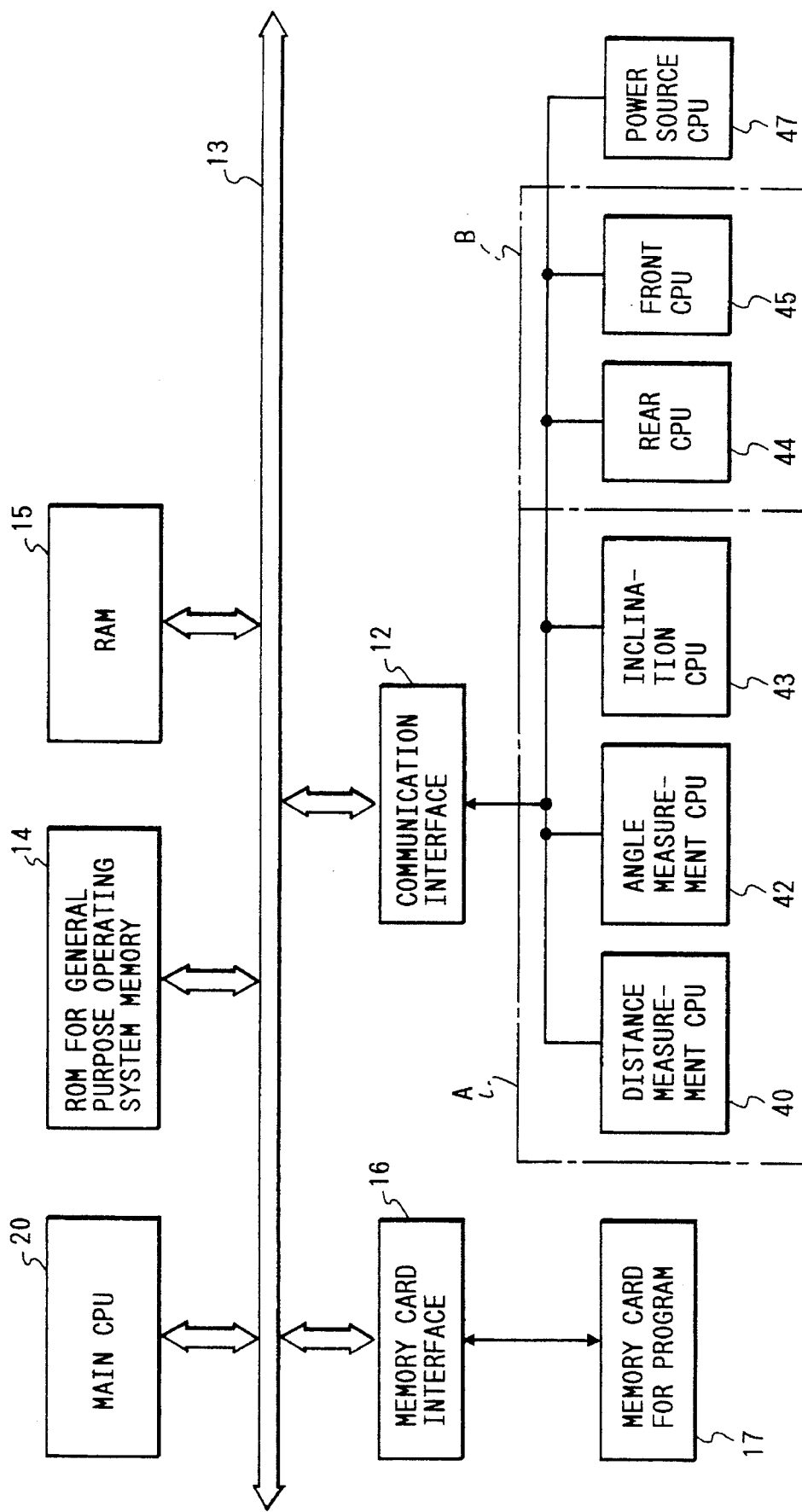
FIG. 2 is a block diagram showing a relationship between principal systems.

FIG. 1 is a general diagram of an electronic survey instrument according to an embodiment of the present invention. FIG. 2 is a block diagram showing a relationship between main systems. A preferred embodiment of the electronic survey instrument according to the present invention will now be explained with reference to FIGS. 1 and 2.

The electronic survey instrument includes a battery (not shown) within a housing 10, and a main system operated with a main CPU 20. The electronic survey instrument also includes a distance measurement subsystem 30 (acting as a measurement subsystem A); an angle measurement subsystem 32; an inclination sensor subsystem 33; a rear display subsystem 34 acting as a display subsystem B; a front display subsystem 35; a power source subsystem 37; and other elements. Two memory card insertion slots are arranged on the upper and lower portions of the electronic survey instrument. A keyboard is connected to each of the rear display subsystem 34 and the front display subsystem 35.

The main CPU 20 which operates a main system in accordance with a distance measurement program is arranged in the main system while sub-CPUs are arranged in corresponding subsystems. The sub-CPUs are connected to the main CPU 20 via a communication interface 12 so as to perform two-way communication.

As, as shown in FIG. 2, the main CPU 20 is connected to plural sub-CPUs 40, 42 to 45, and 47 via the bus 13 and a communication interface 12. The single main CPU 20 is connected to the plural sub-CPUs by parallel bus lines and may communicate with one sub-CPU at a time.

A number of sub-CPUs are included in a preferred embodiment such as a distance measurement CPU 40 for operating the distance measurement subsystem 30; an angle measurement CPU 42 for operating the angle measurement subsystem 32; an inclination CPU 43 for operating the inclination sensor subsystem 33; a rear CPU 44 for operating the rear display subsystem 34; a front CPU 45 for operating the front display subsystem 35; and a power source CPU 47 for operating the power source subsystem 37. Each sub-CPU includes both a communication portion to the main CPU 20 and a command operation portion, with each portion operating as an operating system.

Moreover, each sub-CPU includes an application portion having both a system initializing portion and plural commands. Referring to FIG. 2, a ROM 14 for a general purpose operating system memory, a RAM 15, and a memory card interface 16 for interchanging data between memory cards 17 are connected to the bus 13.

Explanation will be made below for manipulation and operation of an electronic survey instrument according to the present invention, with reference to the flow charts shown in FIGS. 3 to 27.

Figure 3:
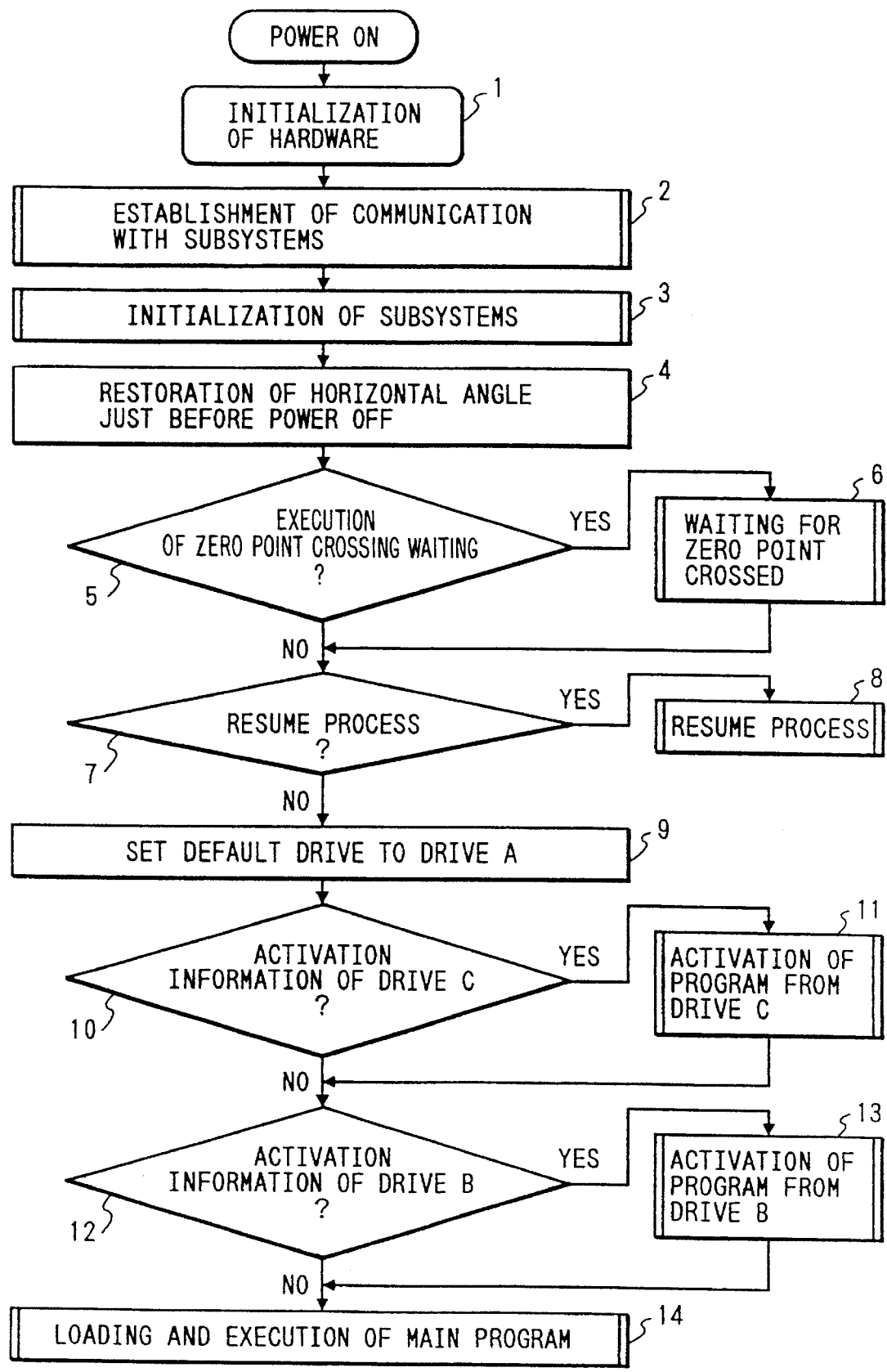
FIG. 3 is a flow chart showing a process ranging from a power-on operation to a main program loading and executing operation.

In FIG. 3, the flow chart shows a general main routine ranging from a step in which the electronic survey instrument of the present embodiment is powered on to a step in which a main program is loaded and then executed. When the power source is turned on, the hardware is first initialized (step 1). Then, whether communications between the main CPU 20 and all the subsystems are normally established is checked (step 2). All the subsystems are then initialized (step 3).

Next, a horizontal angle, saved immediately before the power source is turned off, is restored in the step 4. That is, horizontal angle information is restored based on horizontal angle data immediately before a "power-off" which is time saved in a backup region of a main memory. It is originally necessary to restore both the horizontal angle and the elevation angle. However, since the elevation angle information can be obtained easily in the following step 5, only the horizontal angle information, which is difficult to obtain, is obtained in this step.

In the step 5, it is determined whether the processing should wait for a zero-point crossing of an elevation angle. In the elevation angle measurement, the zero point of an elevation angle measuring encoder agrees with a reference direction (horizontal or vertical direction of the optical axis of a telescope. It is then necessary to perform a zero resetting operation at a reference position. This procedure is completed by rotating the optical axis of the telescope on the vertical plane and then resetting the count value of an encoder to zero when the telescope is agreed in the reference direction. In the present embodiment, since the optical axis of the telescope is aligned with the horizontal direction with respect to the reference direction, the zero point crossing can be completed by slightly rotating the optical axis of the telescope.

In the step 5, when it is determined that there is a zero point crossing waiting, the step 6 shown with the subroutine (to be described later) is executed. After the telescope has crossed the zero point, the process proceeds to the step 7. When the telescope does not cross the zero point, the process skips the step 6 but proceeds to the step 7.

In the step 7, it is determined whether the resume process has been executed at the previous power-off time based on whether a resume flag is set. When a resume flag is set, the process proceeds to the subroutine by way of "resume process" in the step 8. In this case, the resume process restores an original program counter in addition to a display immediately before a power-off time, an operational status of a subsystem, illumination and the like. When a resume process has not been performed, a default drive A is set in the step 9. The drive A is a read-only drive formed as a ROM and stores a program that the survey instrument performs an operation necessary at a minimum.

After the default drive is set to A, the activation information of the drive C is checked (step 10). The drive C is a drive for having an access with the memory card 17 inserted into the memory card insertion slot 11a shown in FIG. 1. Hence, in the step 10, it is checked on whether the memory card 17 to be read with the drive C is inserted into the memory card insertion slot 11a corresponding to the drive C.

When affirmation is obtained in the step 10, the program from the drive C is activated in the subroutine shown in the step 11. In the case where the main program is utilized at the activation or it is judged that the memory card 17 to be read with the drive C has not been inserted into the memory card insertion slot 11a in the step 11, the activation information for the drive B is checked in the step 12. The drive B is a drive that has an access with the memory card 17 inserted into the memory card insertion slot 11b. Hence, in the step 12, it is judged whether the memory card 17 to be read with the drive B has been inserted into the memory card insertion slot 11b.

Figure 21:
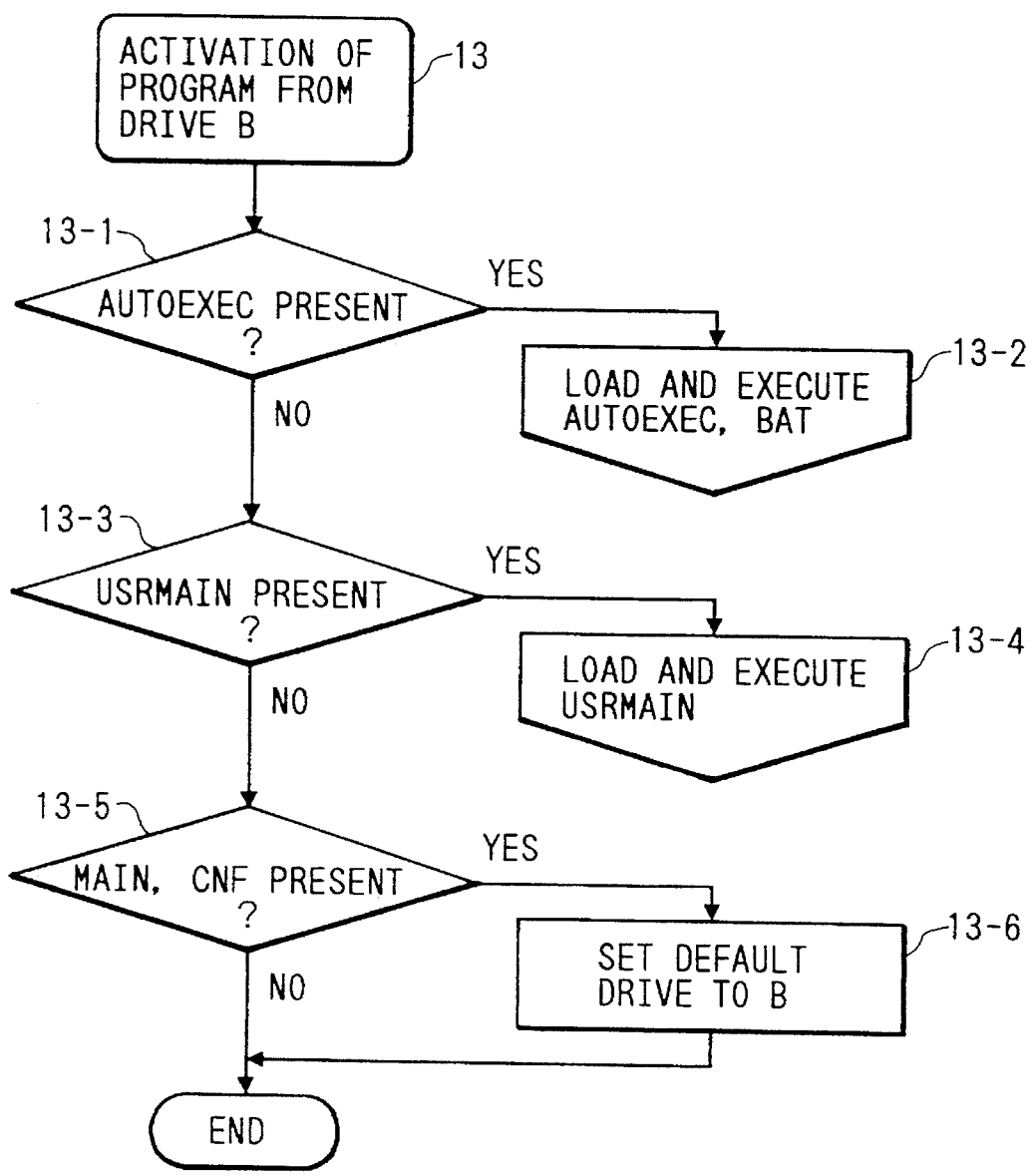
FIG. 21 is a subroutine for "activation of program from drive B" shown in the step 13.

When affirmation is obtained in the step 12, the program from the drive B is activated in the step 13 with a subroutine shown in FIG. 21. In the case where the main program is utilized at the activation or it is judged that the memory card 17 to be read with the drive B has not been inserted into the memory card insertion slot 11b in the step 12, the main program is loaded and executed in the step 14.

Figure 4:
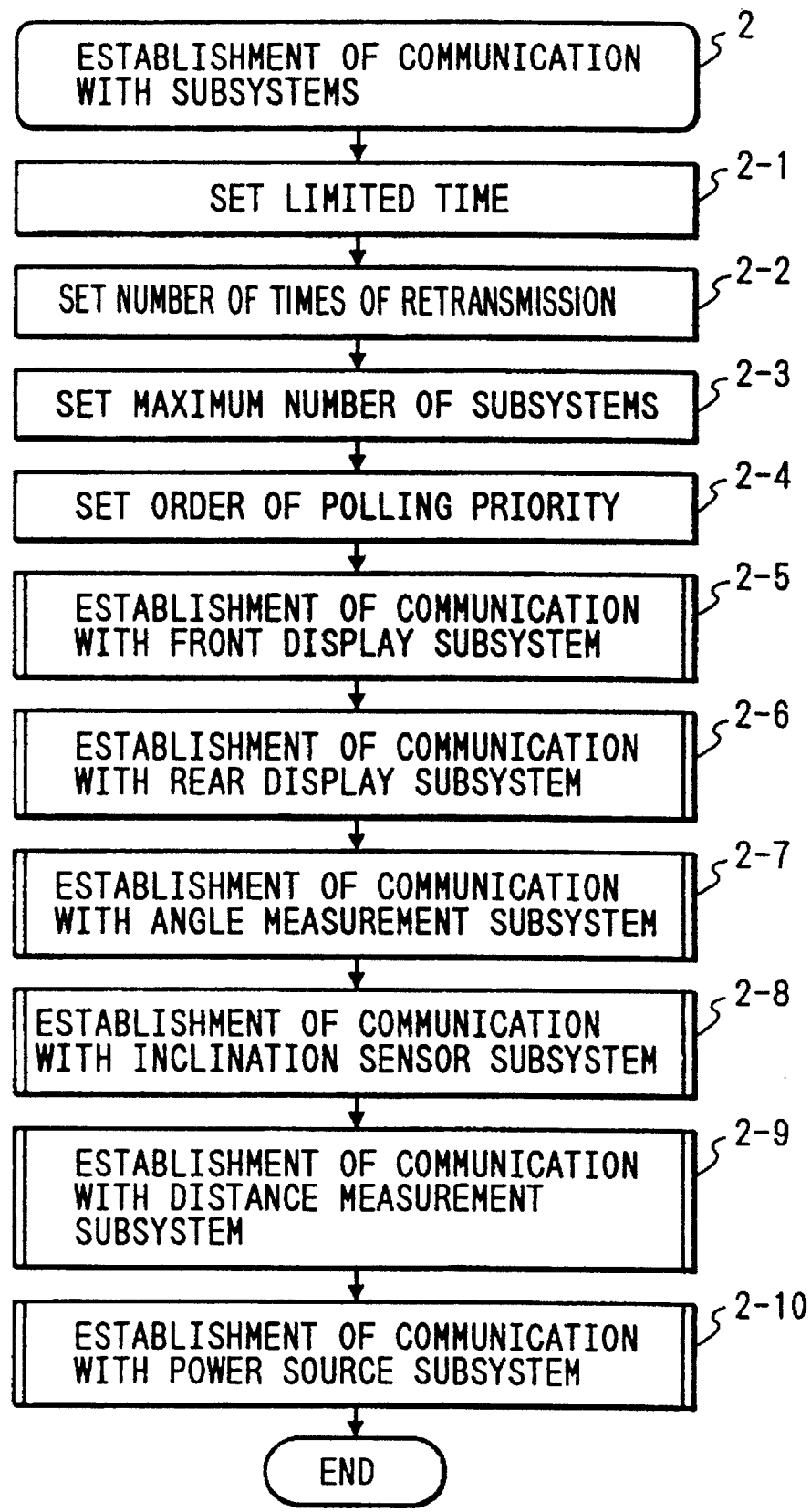
FIG. 4 is a subroutine for "establishment of communication with subsystems" shown in the step 2.

Explanation will be made below as for "establishment of communication with subsystems" shown in the step 2 as the subroutine in FIG. 3, with reference to FIG. 4.

A limited time, or a maximum response waiting time to communicate the CPU 20 with subsystems, is set in the step 2-1. The limited time setting is made to prevent a hang-up when communication is disabled due to a failure or other causes. In the present embodiment, the limited time is set to 200 ms but it can be varied with an application program.

In the step 2—2, when a number of times for retransmission, or a limited time set in the step 2-1 has passed, or abnormal data has been received, the allowable number of times for retransmission is set. Setting the number of times for retransmission prevents the retransmission from being endlessly repeated. In the present embodiment, the number of times for retransmission is set to 16, but it can be varied in accordance with an application program.

Next, the maximum subsystem number is set in the step 2-3. Each subsystem is specified by a predetermined the number. In this case, number is set to the maximum number of subsystems to be connected. In practice, six subsystems are set, including the front display subsystem 35, the rear display subsystem 34, the angle measurement subsystem 32, the inclination sensor subsystem 33, the distance measurement subsystem 30, and the power source subsystem 37.

Then, in the step 2-4, when there are polling priority orders, or data output requests issued from plural subsystems at one time, a data output priority is set to a specific subsystem. A priority is set to a subsystem with a fast data updating period to provide an improved response characteristic. An angle measurement subsystem which can update in about 50 ms is listed as a subsystem with a fast data updating period. The distance measurement subsystem updates data at about 0.5 to 3 seconds, in contrast to the angle measurement subsystem.

Next, communication to each of the subsystems is established in the steps 2-5 to the steps 2-10. These steps will be further described in detail with reference to the subroutines shown in FIGS. 5 to 10. The order of communication establishment to each subsystem, described above, is not important.

Figure 5:
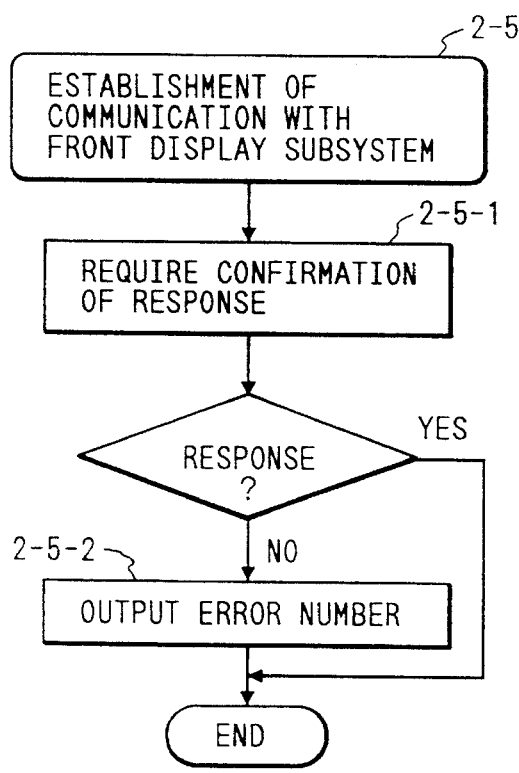
FIG. 5 is a subroutine for "establishment of communication with front display subsystem" shown in the step 2-5.
Figure 6:
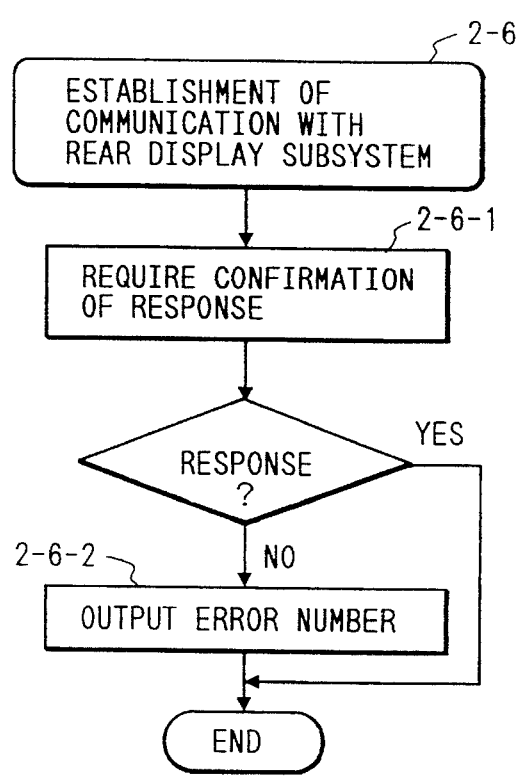
FIG. 6 is a subroutine for "establishment of communication with rear display subsystem" shown in the step 2-6.
Figure 7:
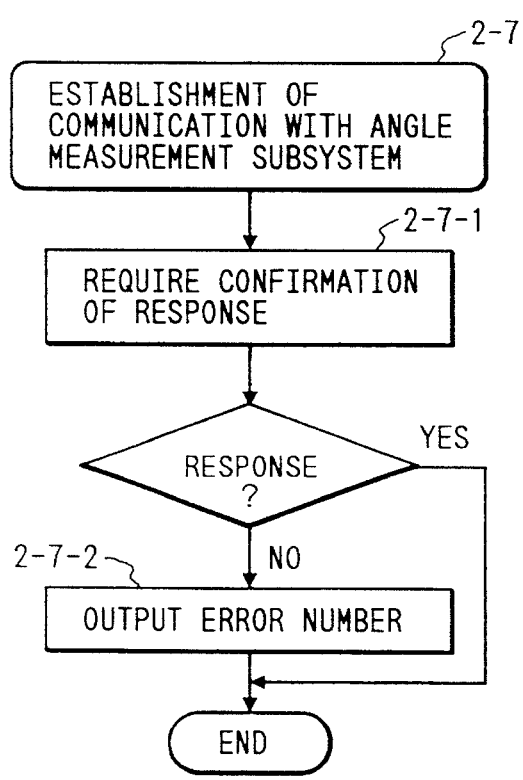
FIG. 7 is a subroutine for "establishment of communication with angle measurement subsystem" shown in the step 2-7.
Figure 8:
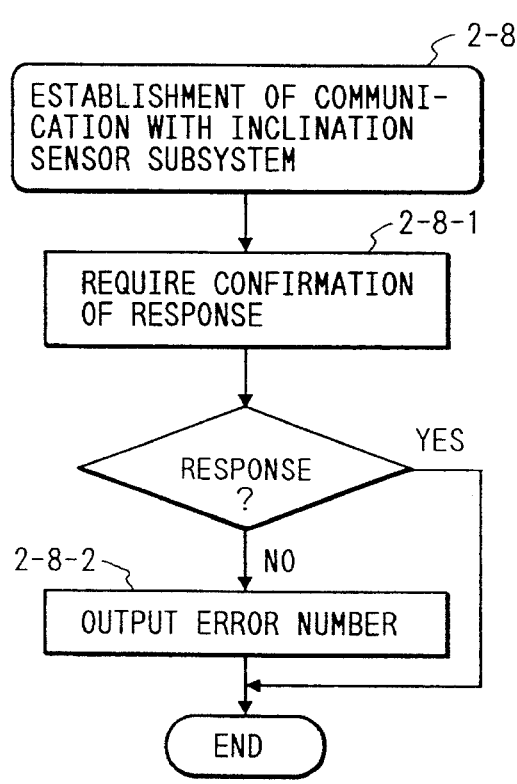
FIG. 8 is a subroutine for "establishment of communication with inclination sensor subsystem" shown in the step 2-8.
Figure 9:
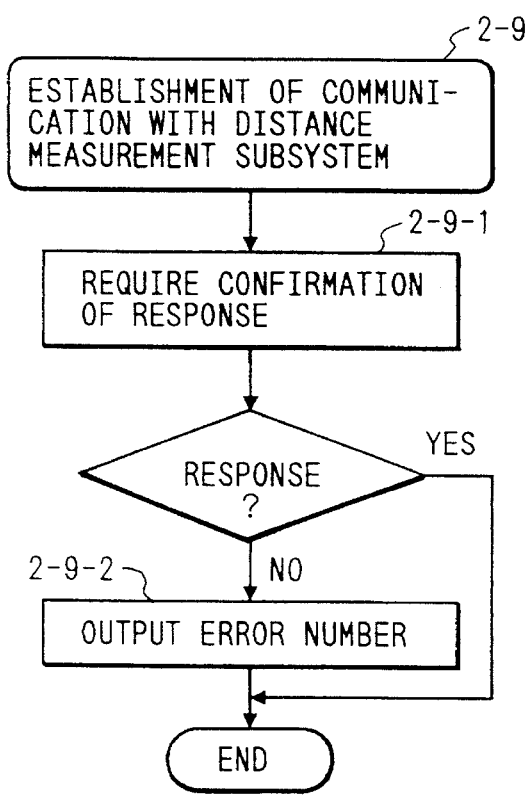
FIG. 9 is a subroutine for "establishment of communication with distance measurement subsystem" shown in the step 2-9.
Figure 10:
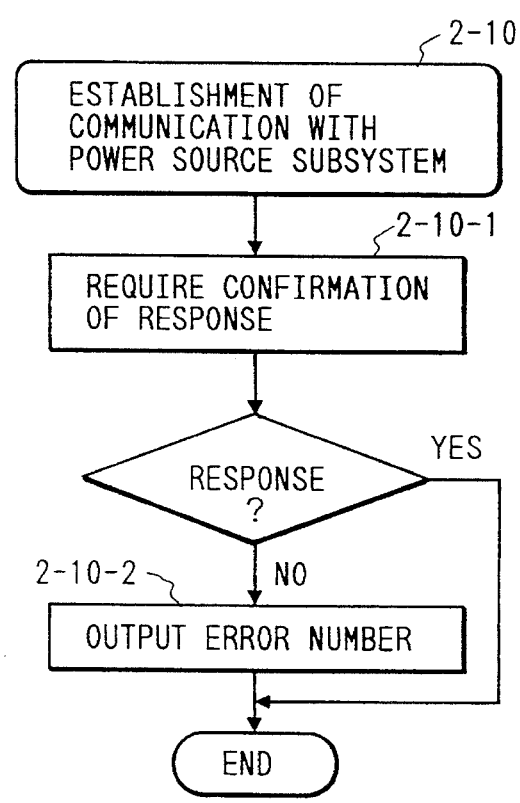
FIG. 10 is a subroutine for "establishment of communication with power source subsystem" shown in the step 2-10.
Figure 11:
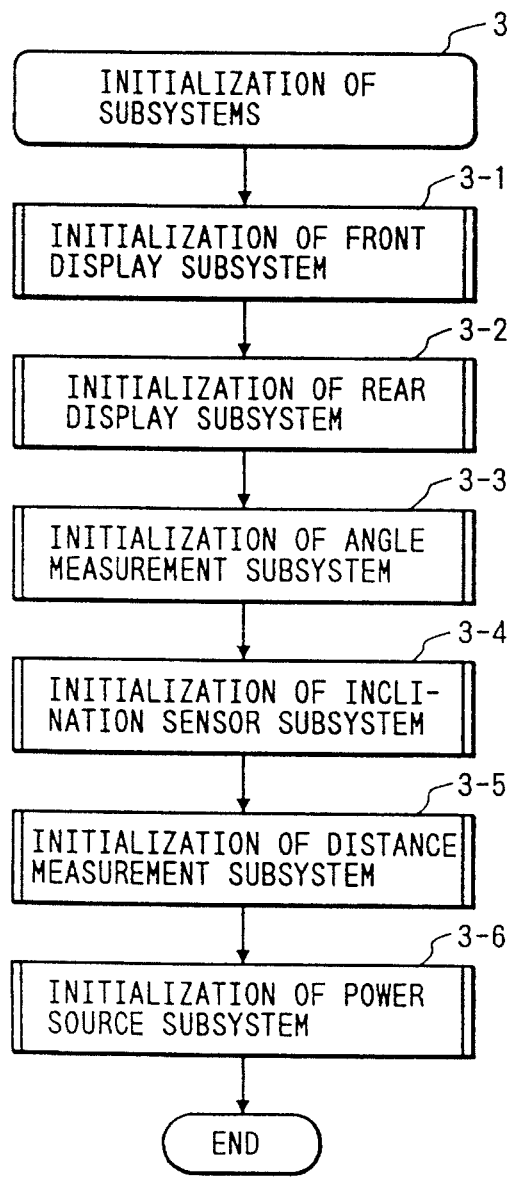
FIG. 11 is a subroutine for "initialization of subsystems" shown in the step 3.

FIG. 5 shows the subroutine for the steps 2-5.

In the step 2-5-1, a response confirmation request is first made to the front display subsystem. When there is a response, communication to the front display subsystem is established and then the subsystem is terminated. When there is no response, an error number is outputted to a reference output (step 2-5-2). A communication output port portion is allocated as the reference output. The display portion may also be allocated as the reference output. In the present embodiment, an error number is outputted to a communication output port with a small number of components and with a low failure probability.

In each subroutine shown in FIGS. 6 to 10, a response confirmation is requested to each subsystem. When there is a response, it is judged that communication is in an acceptance state. When there is no response, the same control as that described with FIG. 5 is performed to output an error number to a reference output. Hence a detailed explanation will be omitted.

Next, a detailed explanation will be made below for a "subsystem initialization" shown in the step 3. In the steps 3-1 to 3-6 shown in FIG. 11, all the subsystems in the electronic survey instrument according to the present embodiment are sequentially initialized. Here, the order of an initialization of each subsystem is not particularly important.

Figure 12:
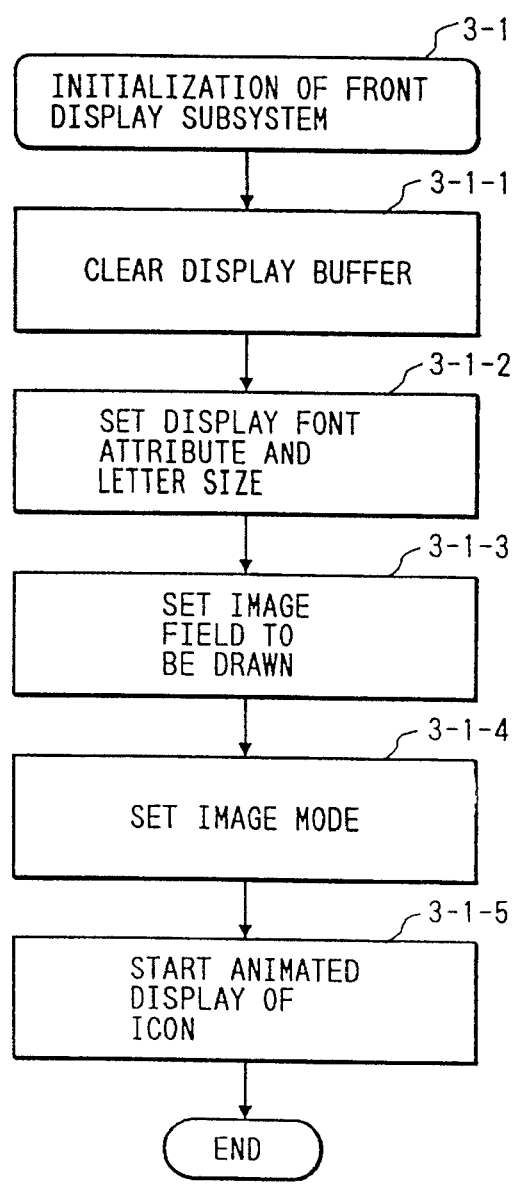
FIG. 12 is a subroutine for "initialization of front display subsystem" shown in the step 3-1.

First, control regarding "front display subsystem initialization" shown in the step 3-1 will be explained in detail with reference to FIG. 12. For initialization, a display buffer is first cleared in the step 3-1-1. Then, a display font, an attribute, and a letter size are set in the step 3-1-2. At first, it is needed to set an initial value by selecting freely the size and shape of letter displayed on the front display portion. An image field to be drawn is set in the next step 3-1-3. Since three physical image fields and three virtual image fields to be synthesized and displayed, it is needed to designate a specific image field to be displayed at a drawing time. Usually, a virtual image field used best of all is set as the image field to be drawn.

Next, an image mode (displayed on the front subsystem), or an image mode (setting an arithmetic operation between three physical image fields, flashing, depth or the like), is performed in the step 3-1-4. Here, an arithmetic operation refers to a logical product or logical sum between liquid crystal layers of three physical image fields. By performing such an operation, a suitable image is displayed as one image.

An animation display of an icon representing "being at work" is started in the step 3-1-5. The display portion can display an animation image representing a waiting time independently of other controls. After an initiation of this step, an animation mode is set to swing the image till a program activation image is actually established so that a lapse of time is displayed. In concrete, an hourglass, animated on a screen, displays a lapse of time until a program activation screen is established.

Figure 13:
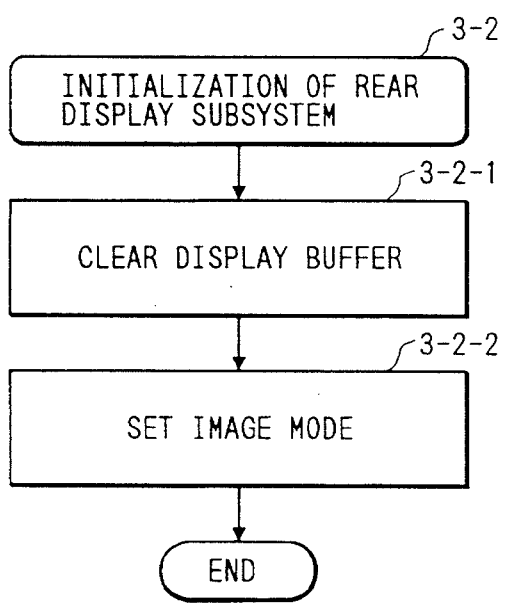
FIG. 13 is a subroutine for "initialization of rear display subsystem" shown in the step 3-2.

In order to initialize the rear display subsystem shown in FIG. 13, a display buffer is cleared (in the step 3-2-1) while an image mode is set (in the step 3-2-2). Since each step is the same as that in FIG. 12, a detailed explanation is omitted.

Figure 14:
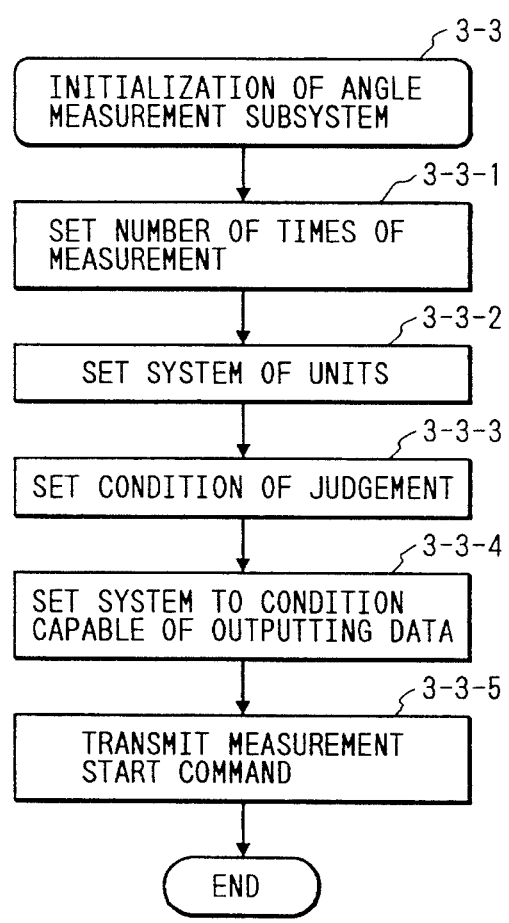
FIG. 14 is a subroutine for "initialization of side angle subsystem" shown in the step 3—3.

Next, an explanation will be made for an "angle measurement subsystem initialization" shown in the step 3—3, with reference to FIG. 14.

First, the "number of times" measurement is set to obtain a data average (step 3-3-1). That is, conventionally, errors have been eliminated by performing a measuring operation in an angle measurement a number of times to obtain an average value. However, in the present embodiment, the number of times measurement is set when the main CPU 20 is activated. In practice, an average is calculated by performing an angle measurement 16 times for 50 ms. However, an application program can vary the time period and the number of times.

Next, a unit system of an output angle is set (in the step 3-3-2). Degree data can be outputted using as an output angle unit system in the angle measurement portion an unit system selected from degree-minute-second, GON, MIL6400, MIL600, and radian. When a power source is switched on, the output system is set to a default unit using degree-minute-second.

Next, a judging requirement for stability of degree measurement value is set in the step 3-3-3. The degree measurement portion outputs a flag indicating a stability of degree under measuring in addition to degree data. When data is not stable, for example, during rotation of a telescope, a rough calculation is made in accordance with a flag to improve the response characteristic of a degree display. Hence, it is necessary to set an output requirement of the flag at an activation time. In the embodiment, it is judged that data is stable when the angle is maintained for 30 seconds or more after measuring a degree ten times. However, an application program can set other stable requirements. Thereafter, a data output enabling state is set in the step 3-3-4. Then, a measurement starting command is transmitted in the step 3-3-5.

Figure 15:
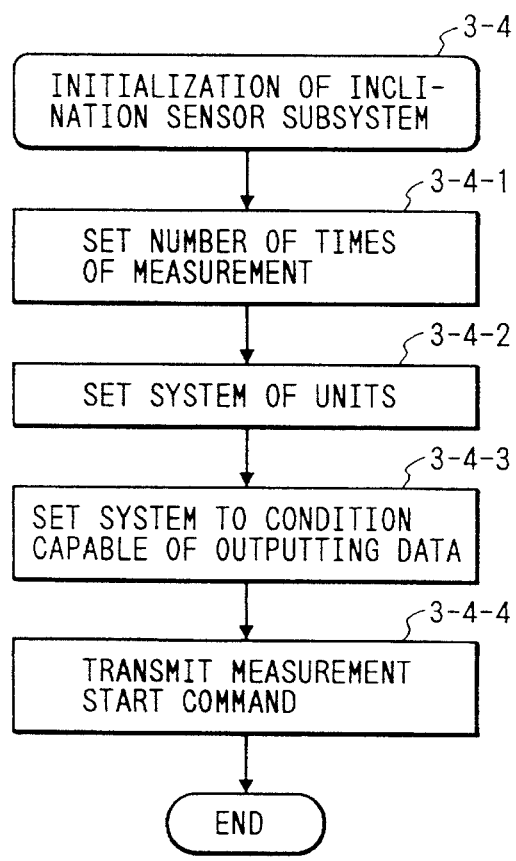
FIG. 15 is a subroutine for "initialization of inclination sensor subsystem" shown in the step 3-4.

Next, an explanation will be made for an initialization of an inclination sensor subsystem shown in the step 3-4, with reference to FIG. 15.

The inclination sensor subsystem is a program which processes an output from an inclination sensor built in to detect the slope of a survey instrument with respect to a level direction. The control, performed in the steps 3-3-1 and 3-3-2, is similarly performed in the steps 3-4-1 and 3-4-2. In the steps 3-4-3 and 3-4-4, a data output enabling state is set and a measurement starting command is transmitted.

The inclination sensor subsystem 33 does not set a judgment requirement because the stability of slope is not critical.

Figure 16:
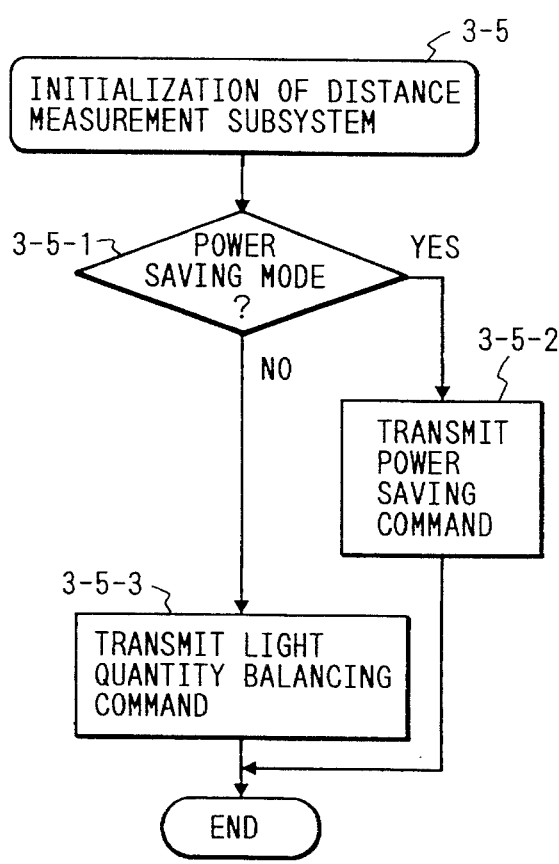
FIG. 16 is a subroutine for "initialization of distance measurement subsystem" shown in the step 3-5.

Next, an initialization of the distance measurement subsystem shown in the step 3-5 will be described with reference to FIG. 16.

First, it is judged whether the distance measurement subsystem is in a power saving mode (step 3-5-1). Since the distance measurement subsystem consumes power most among all subsystems, a power saving mode is prepared therein. Thus, a power saving mode is usually set by turning off a power source or a limiting current. Since the distance measurement procedure cannot be quickly prepared from a power saving mode, this power saving mode can be released in consideration of a response characteristic required.

When it is judged to be a power saving mode, a power saving command is transmitted to the distance measurement subsystem (step 3-5-2). A power saving command is a command that partially or completely shuts down an operation or display in the distance measurement subsystem to reduce power consumption. In the present embodiment, both a digital system and an analog system in the distance measurement subsystem are shut down because less warm-up time required. Such a power saving mode reduces the power consumption of the distance measurement subsystem by one half.

When it is judged that there is no power saving mode in the step 3-5-1, a light quantity balancing command is transmitted (step 3-5-3). A light quantity balancing is a light quantity adjustment where an ND filter is arranged in at least an external optical path, or an internal optical path adjustment to maintain a fixed relationship between the strength of light passing along the external optical path (or the optical path where light is irradiated to a distance measurement target and receives light reflected thereon) and the strength of light passing along the internal optical path (or the optical path for obtaining a reference light compared with that in the external optical path in phase).

Figure 17:
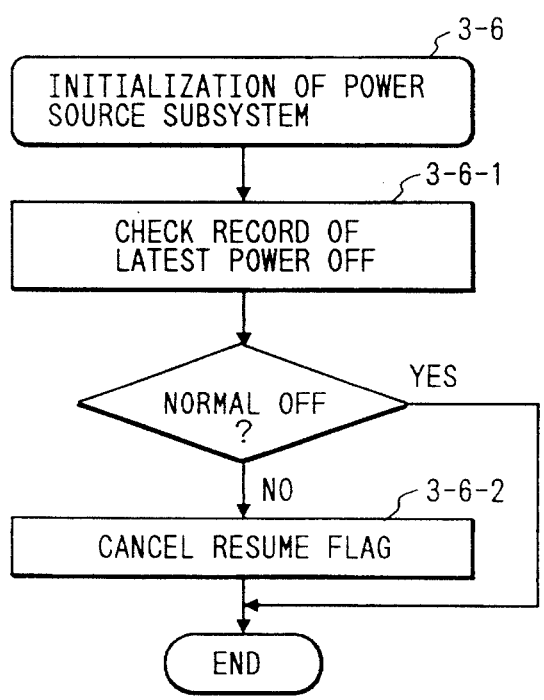
FIG. 17 is a subroutine for "initialization of power source subsystem" shown in the step 3-6.

Next, an initialization of a power source subsystem shown in the steps 3-6 will be explained with reference to FIG. 17.

Here, a record of the last turn-off of a power source is checked (step 3-6-1). In the power source subsystem, since a memory stores a record of whether a power source has been normally turned off at the latest power-off time, the main CPU 20 inspects it. If the power source has been normally cut off, end information representing that a power source has been normally turned off is recorded in the step 15-2-6-5 (to be described later). The step 3-6-1 is judged based on the end information. On the other hand, in the case where a battery is taken out carelessly without operating a power source key, the power source is cut without performing an information saving process to a memory by the resume means. At this time, if the system is set up without any measures to restore information from a memory by the resume means, it may run away without any recovery because the memory has no information or incomplete information. In order to avoid such a runaway, it is checked whether a power source is normally cut off based on the previous power-off record.

As a result of checking, when a memory stores the end information representing that a power source has been normally cut off, the initialization of the power source subsystem is terminated without any change. When the memory does not store the end information, the resume flag is canceled (step 3-6-2). That is, when the power source has not been normally cut off at a previous stage, a resume process is suspended temporarily during a current power-on period and without turning off the resume function itself.

When the resume flag is canceled, it is judged that there is no resume process in the step 7 so that a program is loaded in the steps 9 to 12.

Figure 18:
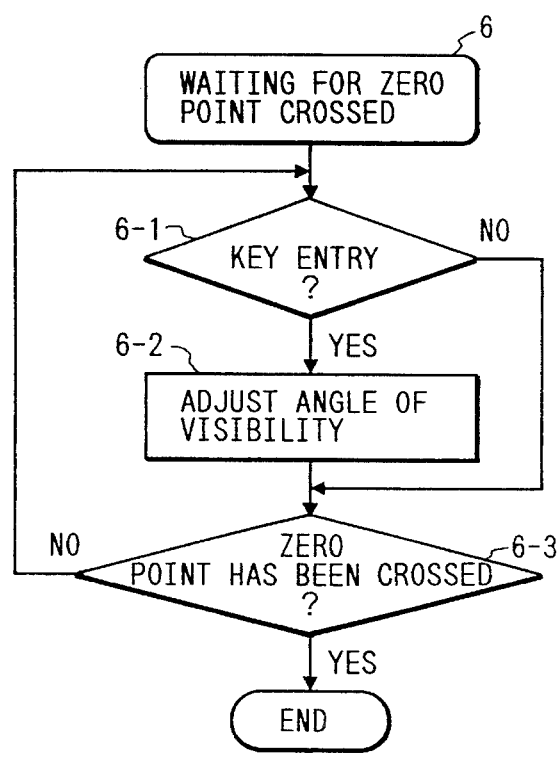
FIG. 18 is a subroutine for "wait for zero point crossing of telescope" shown in the step 6.

Next, an explanation will be made of subroutine for a zero point crossing waiting mode of a telescope in the step 6, with reference to FIG. 18.

First, a key entry is checked (step 6-1). Usually, while waiting for a zero point crossing of a telescope, a title or an operation request is fixedly displayed. While there is a key entry, an adjustment is made to obtain a visible liquid crystal image or an angle of visible field (step 6-2). In concrete, a visual field angle adjusting scale is displayed to operate in accordance with a key entry operation so that a polarizing orientation can be adjusted by varying a voltage applied to a liquid crystal layer.

After a key entry is made, to adjust a visual field angle of a liquid crystal, or is not made, a zero point crossing is checked in the following step 6-3. Namely, the program returns to the step 6-1 if the telescope has not crossed the zero point, and the program returns to FIG. 3 if the telescope has crossed the zero point.

Figure 19:
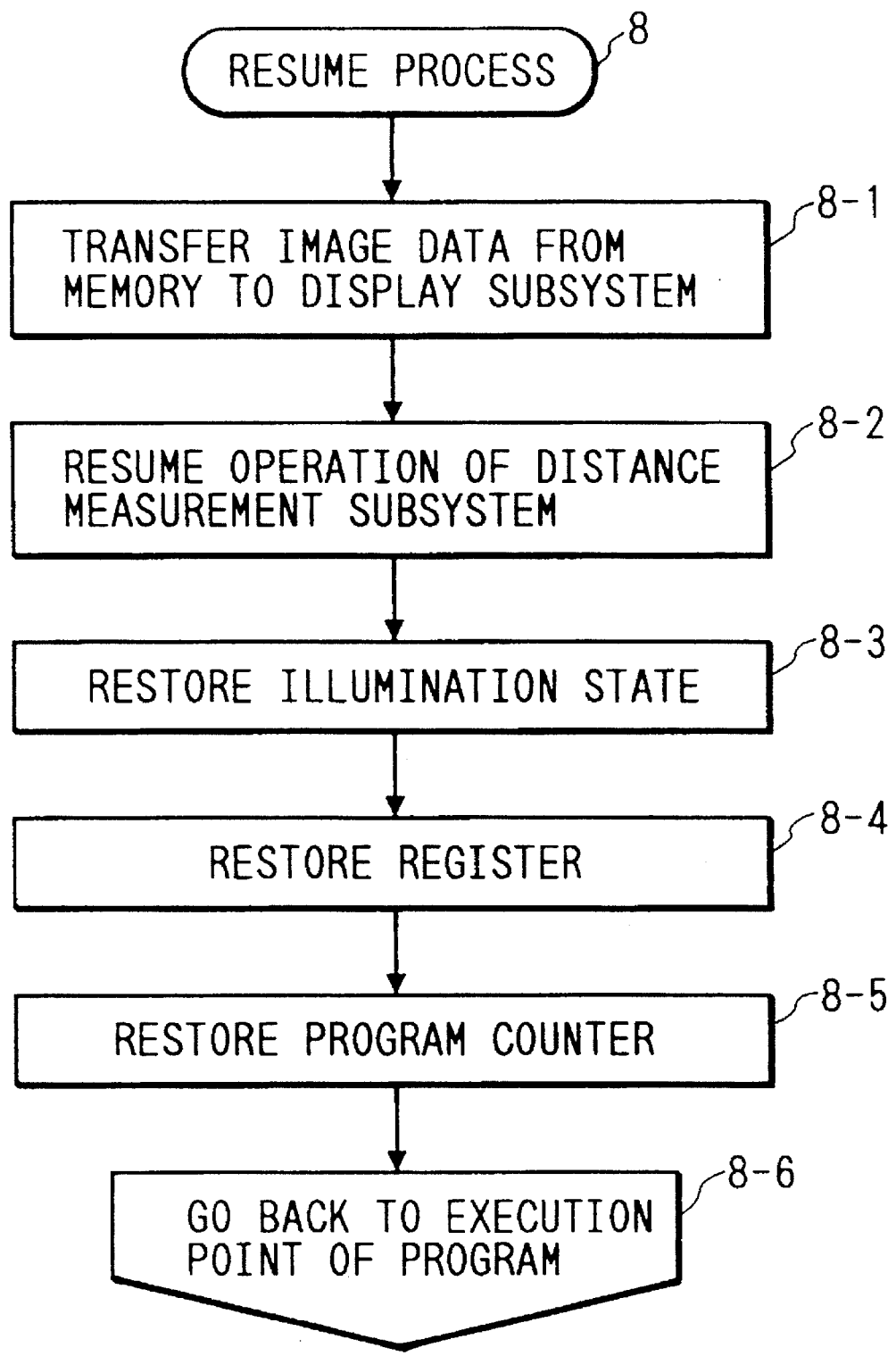
FIG. 19 is a subroutine for "resume process" shown in the step 8.

Next, the resume process in the step 8 will be described below according to the subroutine shown in FIG. 19.

In the resume process, an image content saved in a memory, is transferred to the display subsystem (step 8-1) to resume an operation of the distance measurement subsystem saved (8-2). Thereafter, the illumination status saved is restored (step 8-3) and the registers saved are restored (step 8-4). Moreover, the program counter saved in a memory is restored (step 8-5). Thus, the status is restored to the program execution position held immediately before a power-off time (step 8-6). After an image is restored through a series of resume processes, the operational state of a subsystem and illumination are restored. Then the status is returned to the original program counter position. Hence, when "resume process" in the step 8 is executed, it is unnecessary to load a program in the steps 9 to 12 at a power-on time.

Figure 20:
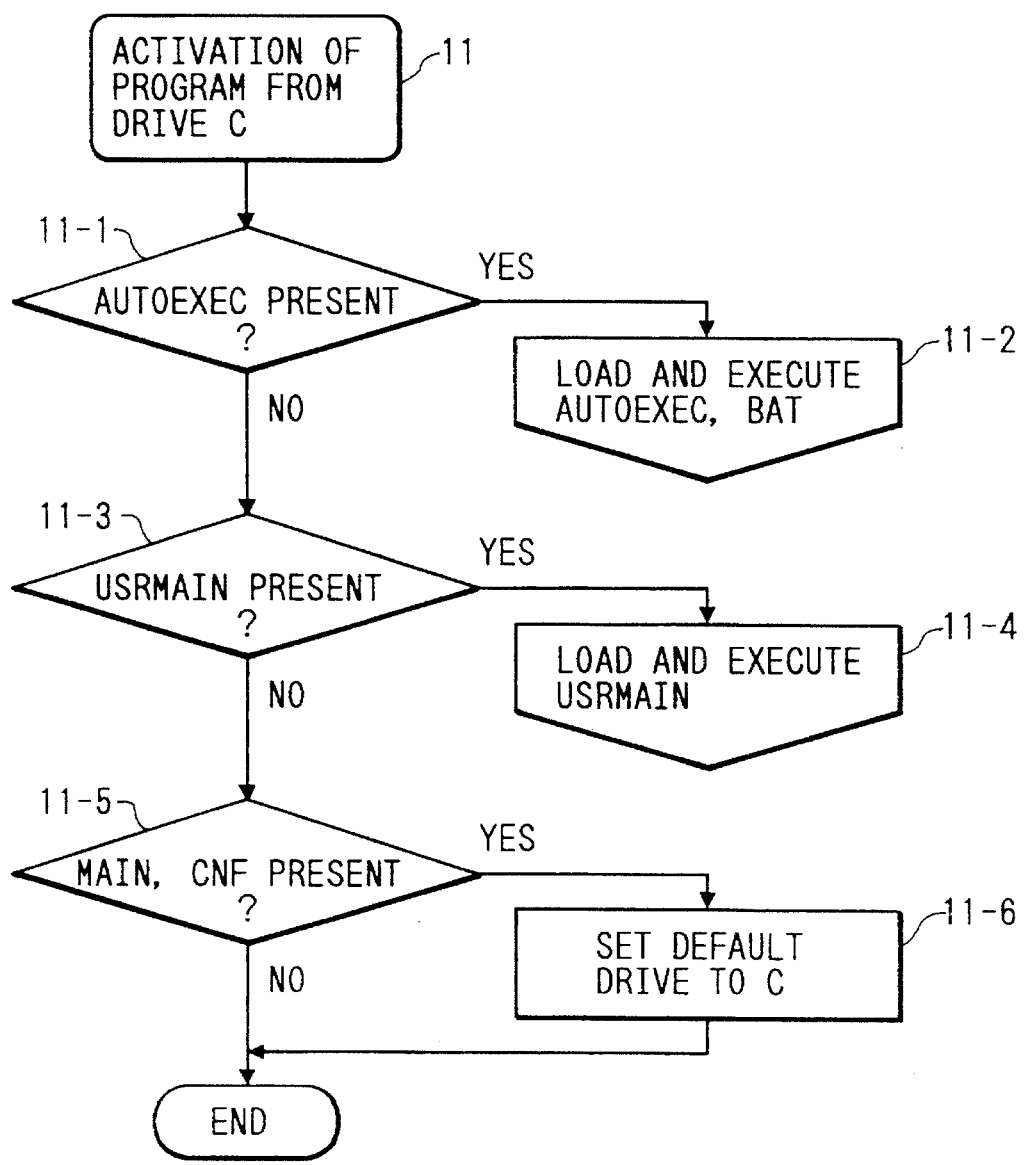
FIG. 20 is a subroutine for "activation of program from drive C" shown in the step 11.

Next, the subroutine for program activation from the drive C in the step 11 will be explained with reference to FIG. 20.

Here, at first, a presence of a batch command file name (for example, AUTOEXEC) is checked (step 11-1). Method of executing a program under MS-DOS includes a method using a command file and a method directly activating an execution program. This subroutine uses the former method. A command file is then used to activate a user program so that the existence of the command file is first checked.

When the step 11-1 confirms the existence of the batch command file, a user program "AUTOEXEC. BAT" is loaded and executed (step 11-2). When the step 11-1 does not confirm the existence of a batch command file, the existence of an execution program (for example, USR-MAIN) is checked (step 11-3). That is, in order to execute a program under MS-DOS, even when the existence of the command file is not confirmed, a user program can be activated if the existence of an execution program is confirmed. Hence, after the existence of the batch command file is checked, the execution of an execution program is checked. When the existence of an execution program is confirmed in the step 11-3, "USRMAIN" is loaded and executed (step 11-4).

Next, in the case where the existence of a batch command file is not confirmed in the step 11-1 and the existence of an execution program is not confirmed in the step 1-3, the execution of a menu definition file "MAIN. CNF" is checked (step 11-5). In the case where the existence of a batch command file is confirmed in the step 11-1 and the existence of an execution program is confirmed in the step 11-3, all post-processes are shifted to an application program. Therefore, when a user tries to make a simple program and to execute it, he has to make all program selection menus or the like by himself.

In this system, since a read-only drive menu program in a ROM form stored in the drive A is used for a menu selection and execution, a user's job is only to form a definition file. A "MAIN. CNP" file, which can store a program's title to be activated as character data, is used as a definition file. Hence, the existence of the menu definition file is checked in the step 11-5, and process returns to FIG. 3 if the menu definition file does not exist. When the existence of the menu definition file is confirmed, the default drive C is set (step 11-6) to terminate the subroutine, and the process returns to FIG. 3.

The subroutine for the program activation from drive B as shown in the step 13 is shown in FIG. 21. Since the subroutine shown in FIG. 21 is similar to the subroutine for the "program activation from drive C" shown in FIG. 20, a detailed explanation is omitted. However, upon completion of step 13-6, or if the inquiry is "NO" for step 13-5, flow returns to FIG. 3.

Figure 22:
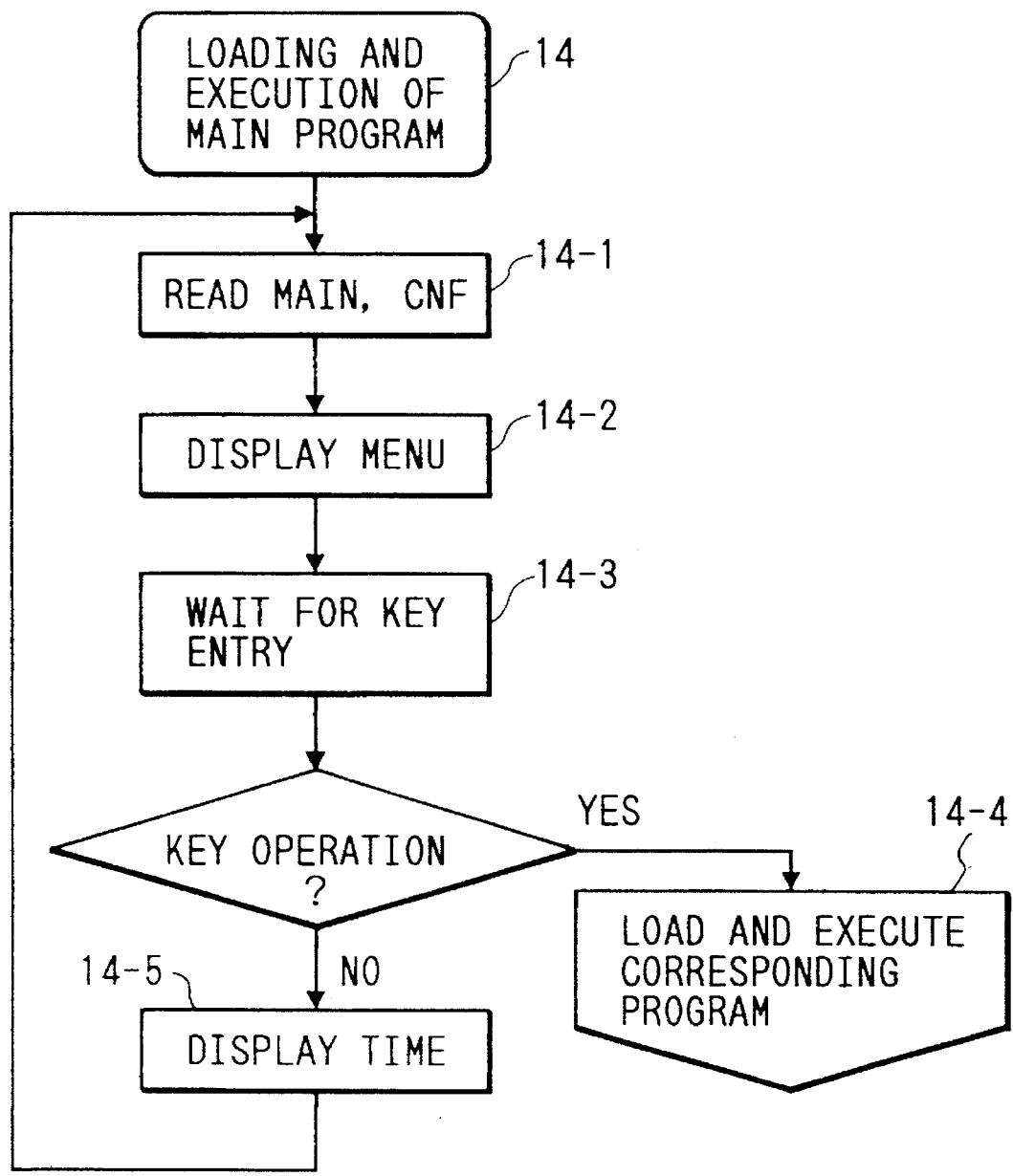
FIG. 22 is a subroutine "loading and execution of main program" shown in the step 14.

Next, a detailed explanation will be made for "load and execution of main program" in the step 14 in accordance with the subroutine shown in FIG. 22.

As shown in the main routine in FIG. 3, "load and execution of main program" in the step 14 is executed in the case default drive is set to A (step 9), the activation information for the drive C is checked (step 10), and the activation information of drive B is checked (step 12). In this case, when the drive C or B is not effectively driven in the step 10 or 12, the main program is loaded and executed with the default drive set to A. Similarly, even if the drive C or B is effective, the main program is loaded and executed in the step 14 when the subroutine shown in FIGS. 20 or 21 has been ended while any drives register no user programs and the default drive is set to C or B in the step 11-6.

Therefore, when the process goes to the step 14 with the default drive set to A in the step 9, "MAIN. CNF" is read as menu data from the default drive in the subroutine in FIG. 22 because the definition file of the default drive is "MAIN. CNF" file (step 14-1).

Even if the default drive C or B is set in the step 11 or 13, "MAIN. CNF" is read as menu data in the step 14-1 because the definition file is formed of "MAIN. CNF", like the case of the default drive A. That is, even if the drive is set to any one of A, B and C, the definition file is read as menu data to load and execute the main program because the definition file is "MAIN. CNP".

Next, a menu is displayed (step 14-2) to sustain a key entry waiting state (step 14-3). When a menu number or ENT is inputted through a key operation, the corresponding program is loaded and executed (step 14-4).

With no key entry, time is displayed (step 14-5) and then the status returns to the step 14-1. In other words, in the step 14, the time is continuously displayed until a key entry allows the step 14-4.

Figure 23:
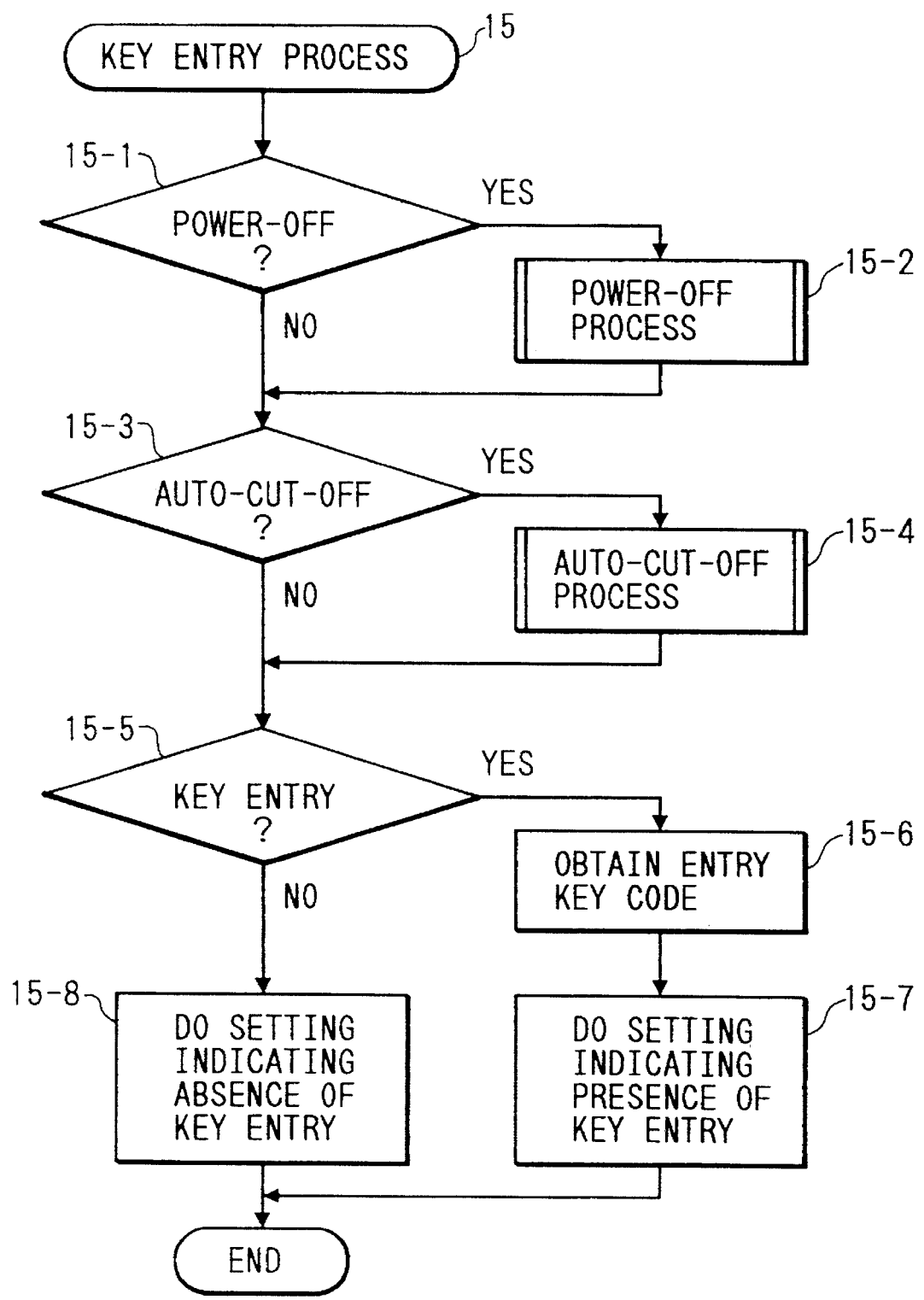
FIG. 23 is a subroutine for "key entry process"

Next a routine including a power-off timing and a key entry process will be explained with reference to FIG. 23.

The key entry process generally refers to a process where a keyboard entry calls back a status from a program. When a key operation is made to cut off a power source, the system automatically returns to a power-off state as a matter of course. However, in some cases, when an application program is in a key entry waiting state, the power-off process is automatically performed with no key entry. Building a power source keying process in a key entry process routine releases a programmer who makes an application program from the troublesome power source keying process to prevent a power-off process from activating at a risky time. A series of routines in the key entry process includes an automatic power-cut-off process.

Here, the "key entry process" will be sequentially explained in the step 15. At first, the status of a power source key (or a power switch) is obtained in the step 15-1 to determine that the power source key has been depressed for a power-off process. With a power source key depressed, the power-off process in the step 15-2 (to be described later) is executed.

If a power-off process has been completed or a power-off process is not forcibly executed by depressing down a power source key, an automatic cut-off checking is then performed (step 15-3). That is, when the automatic cut-off is in an ON state, an automatic cut-off process is executed in the step 15-4 (to be described later). If an automatic cut-off process has been completed or an automatic cut-off process is not in an ON state, a key entry is checked in the step 15-5. When there is a key entry, an input key code is obtained (step 15-6) to set a presence of a key inputting (step 15-7). When there is no key entry, no key entry is set (step 15-8). After the step 15-7 or the step 15-8 is executed, the process returns to the original program which called the subroutine of FIG. 23, such as block 14-4 of FIG. 22.

Figure 24:
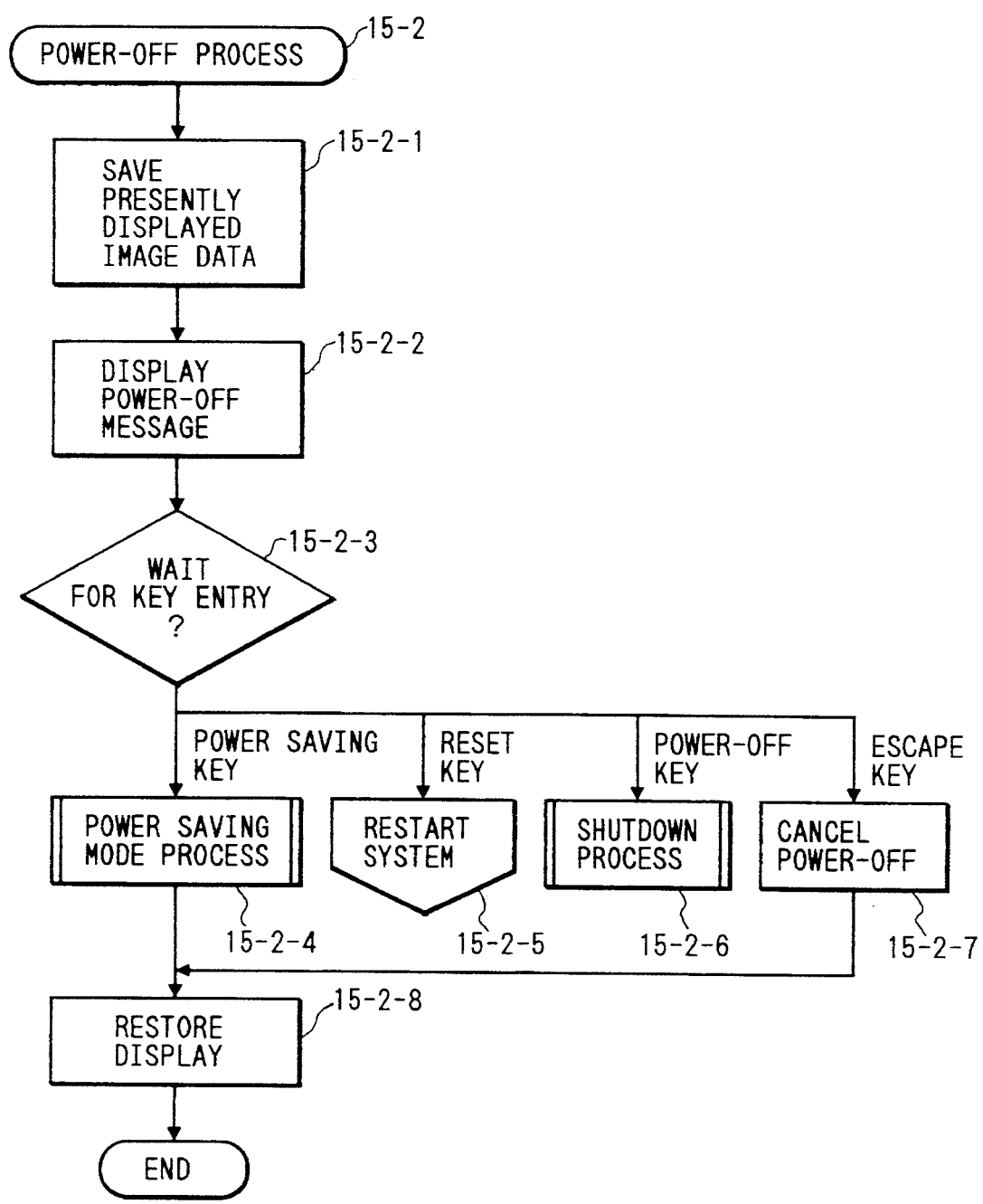
FIG. 24 is a subroutine for "power-off process" shown in the step 15-2.

Next, the power-off process shown in the step 15-2 will be explained with reference to the subroutine in FIG. 24.

First, an image content displayed is saved into a backup memory for a main memory (step 15-2-1). Next, a power-off message is displayed on the display screen (step 15-2-2) to bring about a key entry waiting state (step 15-2-3). In this state, an operable key includes a power saving key, a reset key, a power-off key, and an escape key.

When the power saving key is depressed, a display content is restored after an execution of a power saving mode process (steps 15-2-4 and 15-2-8). On the other hand, when the reset key is depressed, the system is restarted (step 15-2-5). When the power-off key is depressed, a shutdown process is executed (step 15-2-6). When the escape key is depressed, the display content is restored after a power-off mode is canceled (steps 15-2-7 and 15-2-8). After step 15-2-7, flow proceeds to step 15-2-8, then to step 15-2 of FIG. 23.

Figure 25:
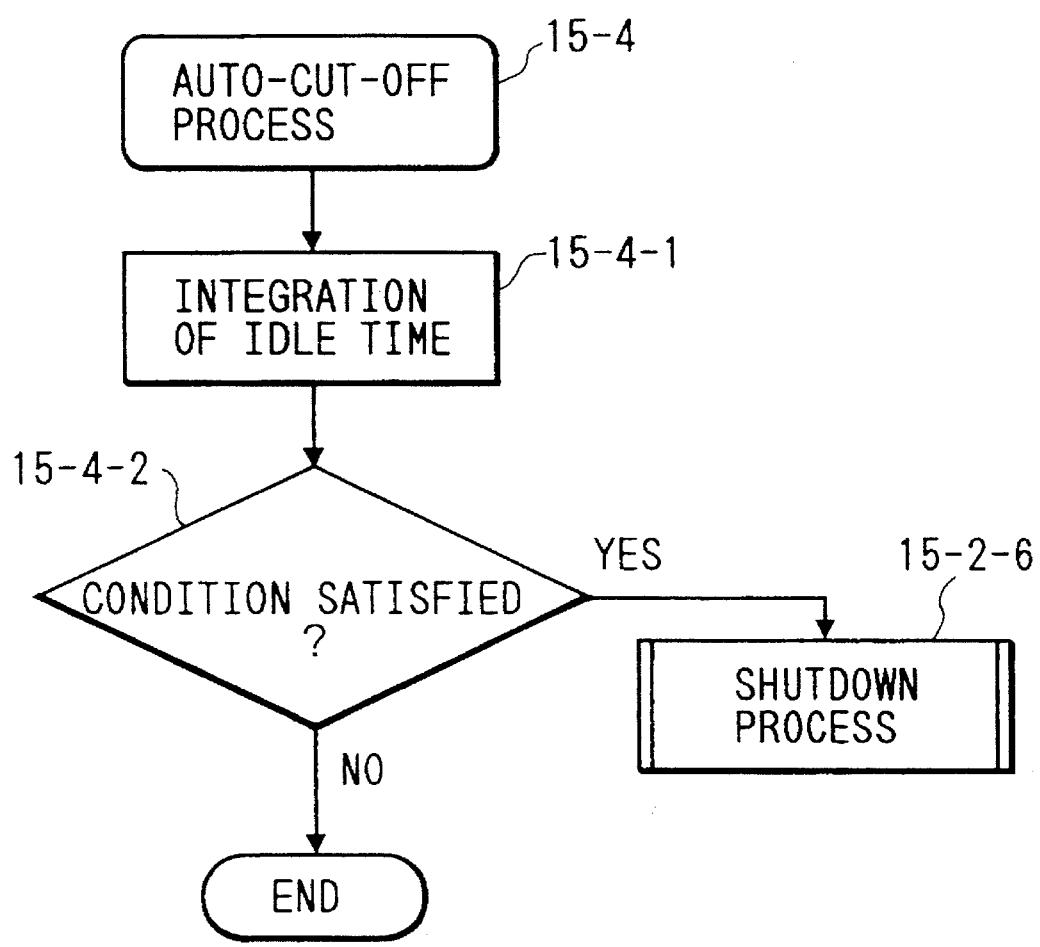
FIG. 25 is a subroutine for "automatic cut-off process" shown in the step 15-4.

Next, a subroutine for an automatic cut-off process shown in the step 15-4 will be explained with reference to FIG. 25. This process is subjected to a main power source or only to a distance measurement subsystem.

In the first step 15-4-1, idle time, or time during which no key operation is executed (or time during which a variation in degree is not detected), is accumulated. The idle time is properly preset between one to sixty minutes.

Next, an automatic cut-off condition is evaluated and then it is judged whether the automatic cut-off process should be performed (step 15-4-2). The automatic cut-off condition is that the time accumulated in the step 15-4-1 has reached a preset idle time, and a distance measurement is not under operation.

When the automatic cut-off condition has been established, a shutdown process is executed in the step 15-2-6. This shutdown process is similar to the shutdown process in "power-off process" in the step 15-2. When the automatic cut-off condition has not been established in step 15-4-2, the process returns to FIG. 23.

Figure 26:
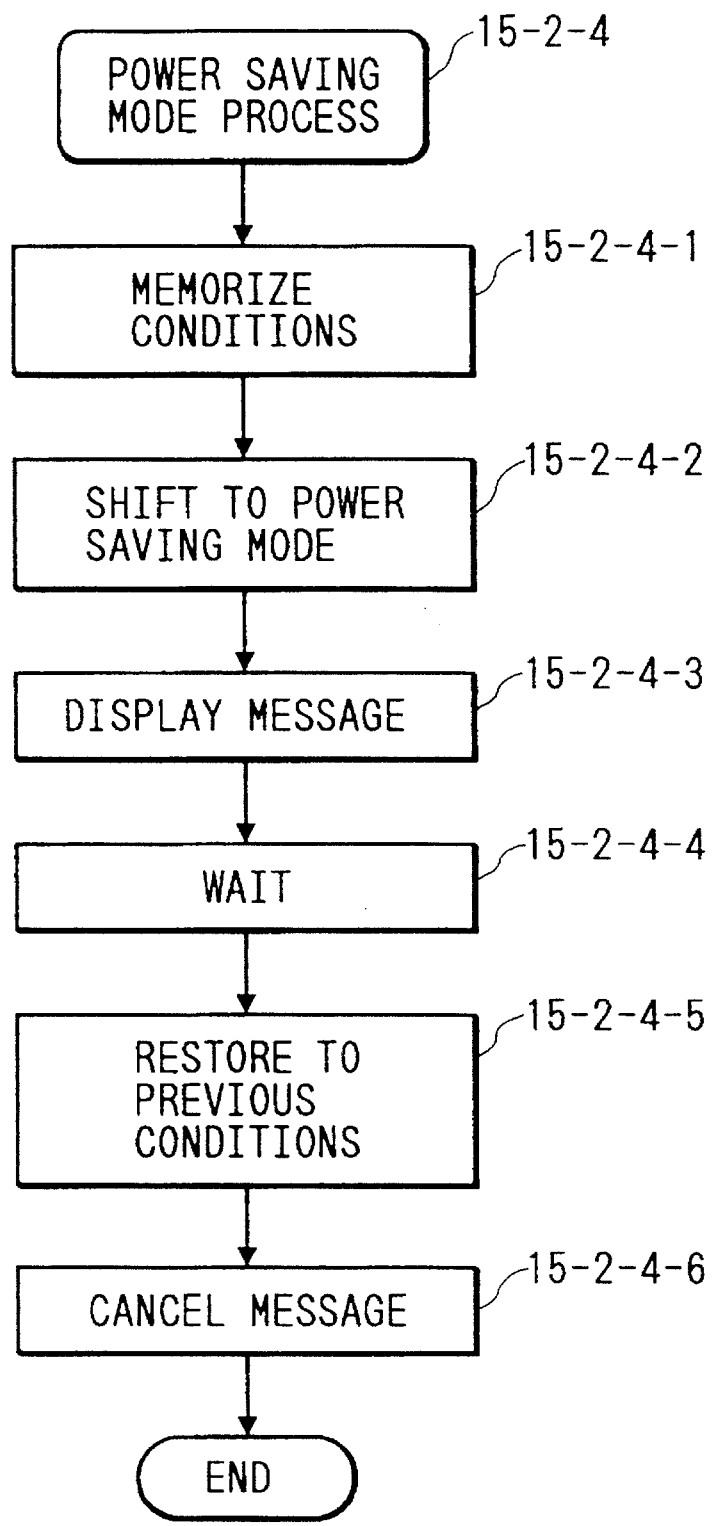
FIG. 26 is a subroutine for "power saving mode process" shown in the step 15-2-4.

Next, a subroutine regarding a "power saving mode process" as shown in the step 15-2-4 will be explained with reference to FIG. 26. Here, "power saving mode process" is prepared in the subroutine for "power-off process", but may be prepared as an independent process. The power saving mode process can also be prepared to all subsystems.

In the step 15-2-4-1, the status of all subsystems and devices by which a power source can be controlled is stored in a backup memory for a main memory. Next, in the steps 15-2-4-2, the subsystems and devices are shifted to a power saving mode. Thereafter, a message representing "being on a power saving" is displayed (step 15-2-4-3), and the status is maintained until a key is depressed (step 15-2-4-4). When all subsystems and devices during a power saving mode are restored to an original state (step 15-2-4-5), the power saving message is erased (step 15-2-4-6), then the process returns to the step 15-2-8 shown in FIG. 24.

Figure 27:
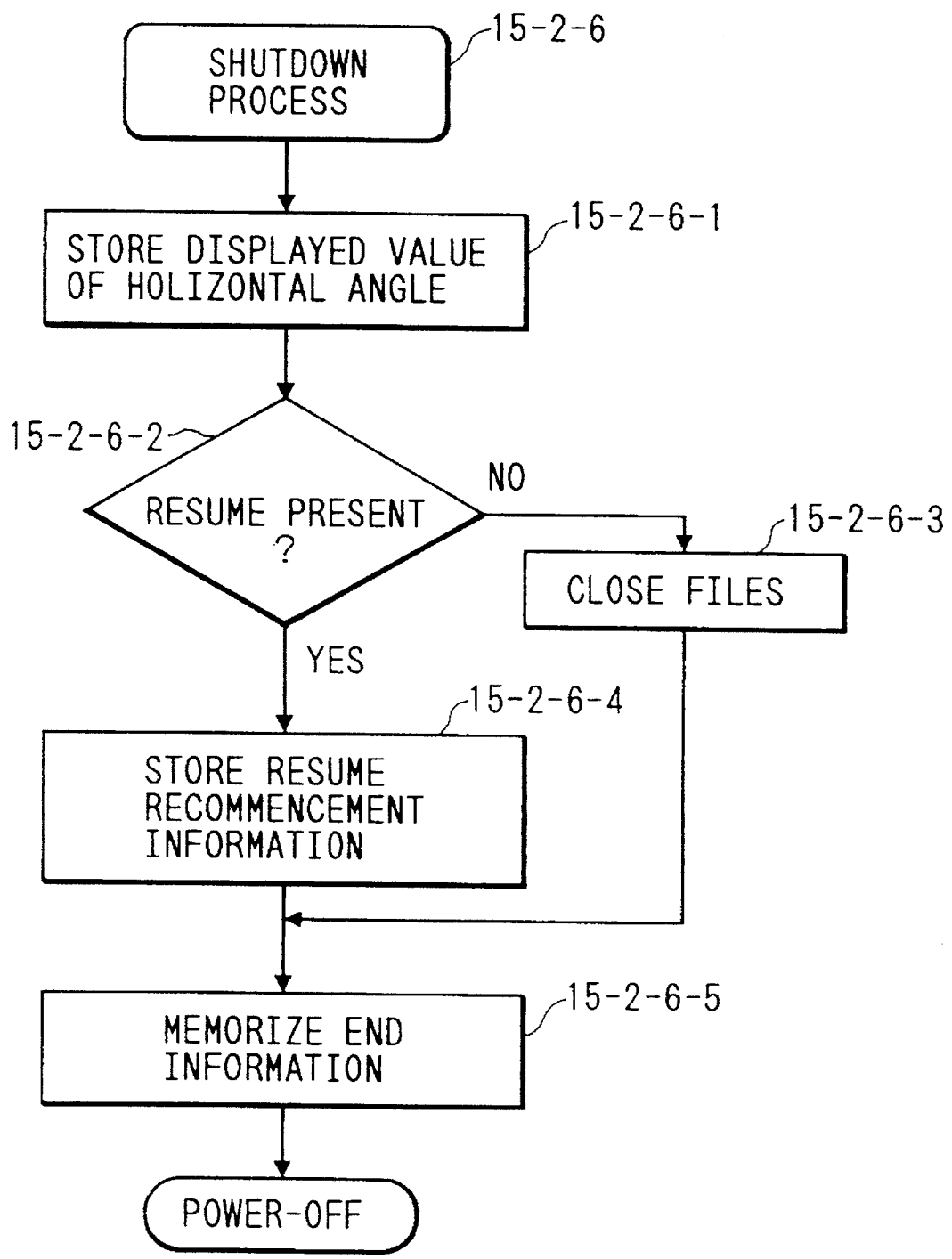
FIG. 27 is a subroutine for "shutdown process" shown in the step 15-2-6.

Next, the shutdown process in the steps 15-2 and 15-4 (step 15-2-6) will be explained in accordance with the subroutine shown in FIG. 27.

When a power-down process is performed, a current horizontal angle display value is first held (step 15-2-6-1). The reason is that a reference point for a vertical angle can be easily determined, but it is difficult in some cases to obtain again a display value of a horizontal angle. Sequentially, a presence or absence of a resume is checked (step 15-2-6-2). When there is no resume, a file in an open state is closed (step 15-2-6-3). When there is a resume, resume recommencement information is stored (step 15-2-6-4). That is, an image immediately before a power source is cut off, operation states of a subsystems, illumination, a program counter, and the like are saved into a memory.

After resume information is stored in the step 15-2-6-4 or a file opened in the step 15-2-6-3 is closed, the information that a power-off operation has been normally executed is stored as end information (step 15-2-6-5).

This end information is then checked in the step 3-6-1. When the check result indicates that end information has been stored as described above, the resume means restores information saved in a memory in the step 8.

If a power source should be unexpectedly cut off, for example, by carelessly taking out a battery, the power-off process in the step 15-2-6 cannot be executed as a matter of course. In this case, a resume flag is canceled in the step 3-6-2 so that the status cannot proceed to the step 8. After the step 15-2-6-5 has ended, the power source is cut off.

What is claimed is:

1. An electronic survey instrument comprising;

a telescope;

a main system which operates based on a survey program and produces an operational command in response thereto;

a plurality of subsystems including a survey subsystem for performing a survey in accordance with said operational command, a display subsystem for displaying a survey result obtained by said survey subsystem in accordance with said operational command, and a power source subsystem for controlling a power supply for said main system, said survey subsystem and said display subsystem;

means for holding horizontal angle information of said telescope, in response to a power-off process for cutting off said power supply by said power source subsystem;

a memory for storing resume recommencement information including information representing a program execution position of said plurality of subsystems, in response to said power-off process;

resume means for restoring an operation status of said subsystems to program execution positions at a time when said power-off process was executed based on said resume recommencement information stored in said memory; and means for restoring said horizontal angle information held by said holding means in response to a recommencement of the power supply by said power source subsystem, and then causing said resume means to execute restorations of the operation status of said plurality of subsystems.

2. An electronic survey instrument according to claim 1, further comprising:

means for storing end information which represents that said resume recommencement information has been stored in the memory while said power source has been normally cut off;

means for judging whether or not said end information is stored in said storing means; and cancelling means for cancelling the restorations of said resume means at a time of recommencement of the power supply if said judging means judges that said end information is not stored in said storing means.

3. An electronic survey instrument according to claim 1, wherein said power source subsystem has a first process mode for cutting off the power supply to at least one of said plurality of subsystems and a second process mode for cutting off the power supply to said main system and all of said plurality of subsystems, wherein said resume means operates during a control process for cutting off the power supply under said second process mode.

4. An electronic survey instrument which determines survey data from horizontal angle information comprising:

a main system executing a power off process and processing a survey program which produces an operational command in response to the survey program;

a plurality of subsystems including a survey subsystem for performing a survey in accordance with said operational command, a display subsystem for displaying a survey result obtained by said survey subsystem in accordance with said operational command, and a power source subsystem for supplying power to said main system, said survey subsystem and said display subsystem;

a memory which holds horizontal angle information in response to the power-off process and stores resume recommencement information including information representing a program execution position of said plurality of subsystems, in response to said power-off process; and means for restoring said horizontal angle information held by said memory in response to a recommencement of the power supply by said power source subsystem.

* * * * *